US006922644B2

United States Patent
Rudrud

(10) Patent No.: US 6,922,644 B2
(45) Date of Patent: Jul. 26, 2005

(54) SYSTEM AND METHOD OF DETECTING FIRE CAUSING CARD SHORTS

(75) Inventor: Paul William Rudrud, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 10/120,877

(22) Filed: Apr. 11, 2002

(65) Prior Publication Data

US 2003/0195709 A1 Oct. 16, 2003

(51) Int. Cl.$^7$ ................................................ G06F 11/00
(52) U.S. Cl. ............................. 702/64; 702/57; 702/58; 702/59; 713/340
(58) Field of Search .......................... 714/5, 11, 14, 714/22, 24, 37, 42, 43, 44, 100; 713/300, 320–322, 324, 330, 340, 500, 501, 502, 503, 660–664; 702/57–59, 64, 65, 67, 69, 117, 118, 124, 126, 125, 183, 121, 189, FOR 103–106, FOR 109, FOR 134, FOR 170–171; 324/509, 512, 522, 525, 523, 527, 691, 713; 340/660–664

(56) References Cited

U.S. PATENT DOCUMENTS

| | | | | |
|---|---|---|---|---|
| 3,801,963 A | * | 4/1974 | Chen | 360/5 |
| 3,875,390 A | * | 4/1975 | Eccles et al. | 714/11 |
| 4,234,920 A | * | 11/1980 | Van Ness et al. | 714/22 |
| 4,491,914 A | * | 1/1985 | Sujaku | 714/38 |
| 4,635,214 A | * | 1/1987 | Kasai et al. | 702/183 |
| 4,726,024 A | * | 2/1988 | Guziak et al. | 714/24 |
| 4,757,505 A | * | 7/1988 | Marrington et al. | 714/22 |
| 4,951,171 A | * | 8/1990 | Tran et al. | 361/90 |
| 5,105,182 A | * | 4/1992 | Shindo | 340/663 |
| 5,283,905 A | * | 2/1994 | Saadeh et al. | 713/324 |
| 5,317,752 A | * | 5/1994 | Jewett et al. | 714/14 |
| 5,339,446 A | * | 8/1994 | Yamasaki et al. | 713/340 |
| 5,437,040 A | * | 7/1995 | Campbell et al. | 713/340 |
| 5,557,738 A | * | 9/1996 | Townsley et al. | 714/14 |
| 5,623,596 A | * | 4/1997 | Townsley et al. | 714/14 |
| 5,708,820 A | * | 1/1998 | Park et al. | 713/323 |
| 5,961,647 A | * | 10/1999 | Kim et al. | 713/300 |
| 6,026,495 A | * | 2/2000 | Lacombe et al. | 713/340 |
| 6,035,421 A | * | 3/2000 | Henno et al. | 714/30 |
| 6,122,758 A | * | 9/2000 | Johnson et al. | 714/47 |
| 6,202,171 B1 | * | 3/2001 | Townsley et al. | 714/14 |
| 2003/0125886 A1 | * | 7/2003 | Spitaels et al. | 702/62 |

* cited by examiner

Primary Examiner—Carol S. W. Tsai
(74) Attorney, Agent, or Firm—Moser, Patterson & Sheridan, LLP

(57) ABSTRACT

Method and apparatus for monitoring and controlling electrical current delivered to a computer subsystem are provided. One embodiment provides a method for detecting a short circuit in a computer subsystem, comprising: obtaining a measured current which is supplied to the computer subsystem during one or more time periods; determining an expected current utilized by the computer subsystem for the one or more time periods; and determining whether a short circuit condition exists based on a comparison between the measured current and the expected current. The method may further comprise terminating electrical power supplied to the computer subsystem.

26 Claims, 3 Drawing Sheets

SYSTEM AND METHOD OF DETECTING FIRE CAUSING CARD SHORTS

BACKGROUND OF THE INVENTION

1. Field of the Invention

The present invention generally relates to a power supply system in a computer system. More particularly, the present invention relates to methods and apparatus for monitoring and controlling electrical current delivered to a computer subsystem.

2. Description of the Related Art

A computer system generally includes one or more power supplies which distribute electrical power to a plurality of components and subsystems in the computer system. To protect the power supply as well as the components receiving electrical power from the power supply, a computer system may utilize a power supply system which shuts down the power supply when the power supply is not functioning properly. However, if a component or a subsystem of the computer system is operating improperly, e.g., when a subsystem has a short circuit, the power supply may continue to deliver the electrical power to the component or subsystem and cause further damage to the component or subsystem. Further damage to other components and subsystems may result, for example, if a fire starts from a short-circuited subsystem.

Therefore, there is a need for a method and apparatus for monitoring and controlling electrical current delivered to a computer subsystem. More particularly, there is a need for a method and apparatus for detecting a short circuit condition on a computer subsystem and terminating the power supplied to the computer subsystem to prevent damage caused by a short circuit.

SUMMARY OF THE INVENTION

The present invention generally provides a method and apparatus for monitoring and controlling electrical current delivered to a computer subsystem. More particularly, the present invention provides a method and apparatus for detecting a short circuit condition on a computer subsystem and terminating the power supplied to the computer subsystem to prevent damages caused by a short circuit.

One embodiment provides a method for detecting a short circuit in a computer subsystem, comprising: obtaining a measured current which is supplied to the computer subsystem during one or more time periods; determining an expected current utilized by the computer subsystem for the one or more time periods; and determining whether a short circuit condition exists based on a comparison between the measured current and the expected current. The method may further comprise terminating electrical power supplied to the computer subsystem.

Another embodiment provides a signal bearing medium, comprising a program which, when executed by a processor, performs an operation for detecting a short circuit in a computer subsystem according to the foregoing method.

Another embodiment provides a system for detecting a short circuit in a computer subsystem, comprising: a current monitor disposed on a power regulator for monitoring electrical current supplied to the subsystem; a control chip disposed on the subsystem for monitoring operations performed on the subsystem; and a service processor connected to receive information from the current monitor and the control chip, the service processor configured to: obtain a measured current which is supplied to the computer subsystem during one or more time periods; determine an expected current utilized by the computer subsystem for the one or more time periods; and determine whether a short circuit condition exists based on a comparison between the measured current and the expected current.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides a method and apparatus for monitoring and controlling electrical current delivered to a computer subsystem. More particularly, the present invention provides a method and apparatus for detecting a short circuit condition on a computer subsystem and terminating the power supplied to the computer subsystem to prevent damages caused by a short circuit.

One embodiment of the invention is implemented as a program product for use with a computer system such as, for example, the computer system 10 shown in FIG. 1 and described below. The program(s) of the program product defines functions of the embodiments (including the methods described below with reference to FIG. 2) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
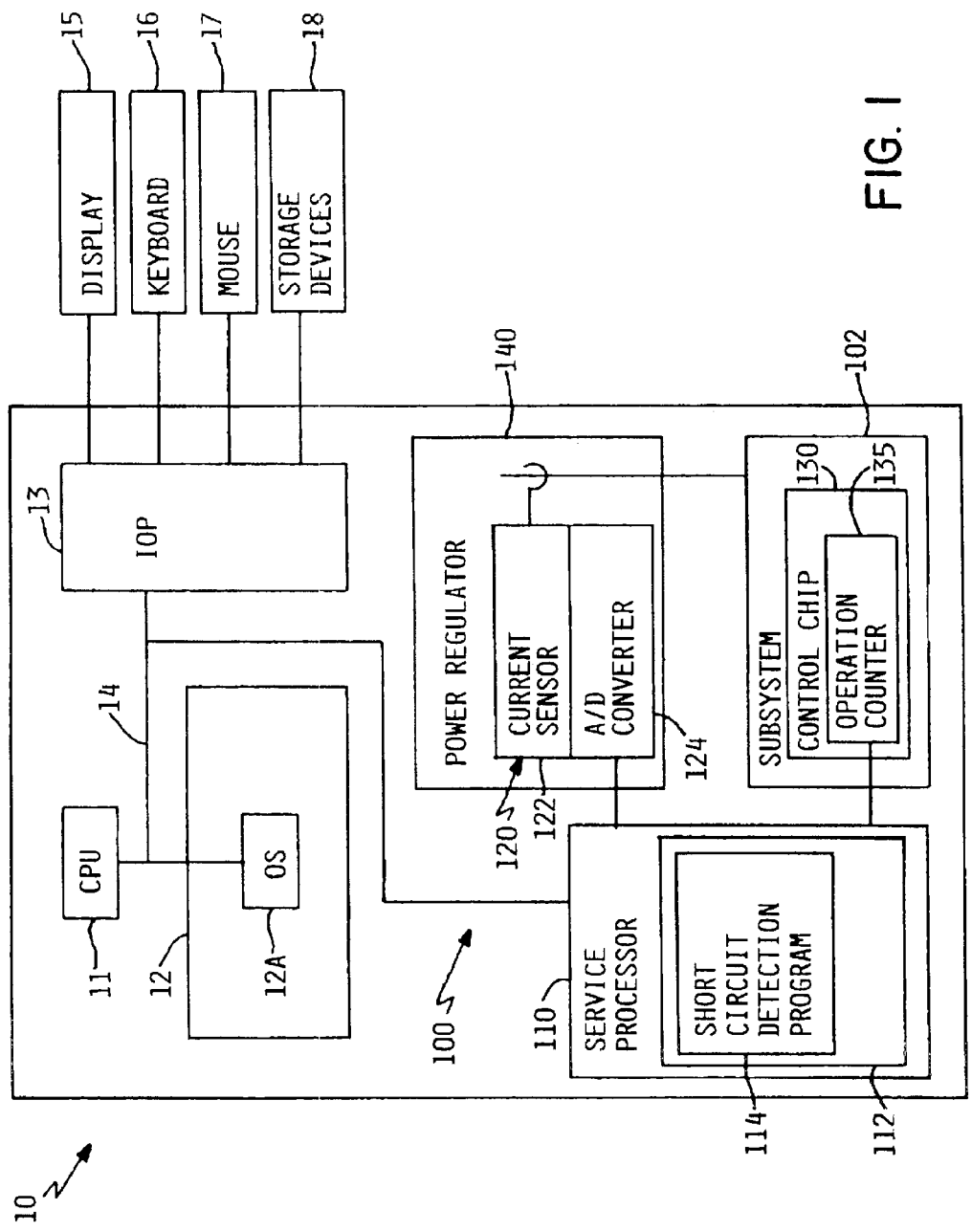
FIG. 1 is a block diagram illustrating a computer system 10 including one embodiment of a system 100 for monitoring and controlling electrical current delivered to a computer subsystem 102.

FIG. 1 is a block diagram illustrating a computer system 10 including one embodiment of a system 100 for monitoring and controlling electrical current delivered to a computer subsystem 102. The computer system 10 generally comprises a central processing unit (CPU) 11, a main memory 12, and an input/output (I/O) processor 13. These system components are interconnected through a system bus 14. Input/output devices, such as a display monitor 15, a keyboard 16, and a pointing device 17 (e.g., mouse), are connected to the computer system 10 through the I/O processor 13. One or more storage devices 18, such as RAID systems, direct access storage devices (DASDs), tape storage devices, CD-ROM (compact disc read only memory), disk drives and other optical or magnetic storage devices, may be connected to the computer 10 through the I/O processor 13. Data files, software programs, and other information may be stored on the storage devices 18.

One or more software programs, such as an operating system 12A, may be stored in the main memory 12 or alternatively, in the storage devices 18. The operating system 12A may be a suitable multitasking operating system which supports a variety of programming environments; however, those skilled in the art will appreciate that the spirit and scope of the present invention is not limited to any one operating system. Other software programs may also be stored in the main memory 12, or alternatively, in the storage devices 18. Operation of the computer system 10 may be controlled by user input through I/O devices such as the keyboard 16 and the pointing device 17.

The system 100 monitors and controls electrical current delivered to the computer subsystem 102. Although only one computer subsystem 102 is shown in FIG. 1, the computer system 10 may include a plurality of computer subsystems, such as a motherboard, one or more PCI cards, one or more memory modules, etc. The system 100 includes a service processor 110, a subsystem current monitor 120, and a control chip 130. The service processor 110 may comprise an integrated circuit which receives data signals or information from the subsystem current monitor 120 and the control chip 130. The service processor 110 is also connected to the power regulator 140 to provide a signal which terminates the electrical power supplied to the computer subsystem 102. The service processor 110 may be a customized hardware component, or alternatively, a part of a central processing unit of a general computer system. In another embodiment, the service processor 110 may be a performance monitor of a general computer system. The service processor 110 may include a memory 112 for storing data, or alternatively, be connected to a memory and/or data storage devices. In one embodiment, a short circuit detection program 114 is stored in memory 112 and run on the service processor 110.

The subsystem current monitor 120 may comprise a current sensor 122 which is disposed on a power regulator 140. The power regulator 140 provides electrical current to the computer subsystem 102. In one embodiment, the current sensor 122 comprises an analog device for measuring electrical current and an integrator for accumulating the measured results. The current sensor 122 is connected to an analog to digital (A/D) converter 124 which converts the measured analog signal into a digital signal that is sent to the service processor 110. The subsystem current monitor 120 monitors the electrical current being supplied to the computer subsystem 102 and provides this information to the service processor 110. In one embodiment, the subsystem current monitor 120 may provide a summed current per time unit supplied by the power regulator 140 to the computer subsystem 102.

The control chip 130 may be a component of the computer subsystem 102 and comprise an integrated circuit which is disposed in communication with the other components of the computer subsystem 102 to control and monitor the tasks performed on the computer subsystem 102. In one embodiment, the control chip 130 includes an operation counter 135 which provides an operation count per time unit which includes the types of operations performed by the computer subsystem and the number of occurrence for each type of operation. Alternatively, the control chip 130 on the computer subsystem 102 may simply comprise an operations counter or any device, such as a buffer, which is capable of monitoring the operations performed by the computer subsystem 102.

Figure 2:
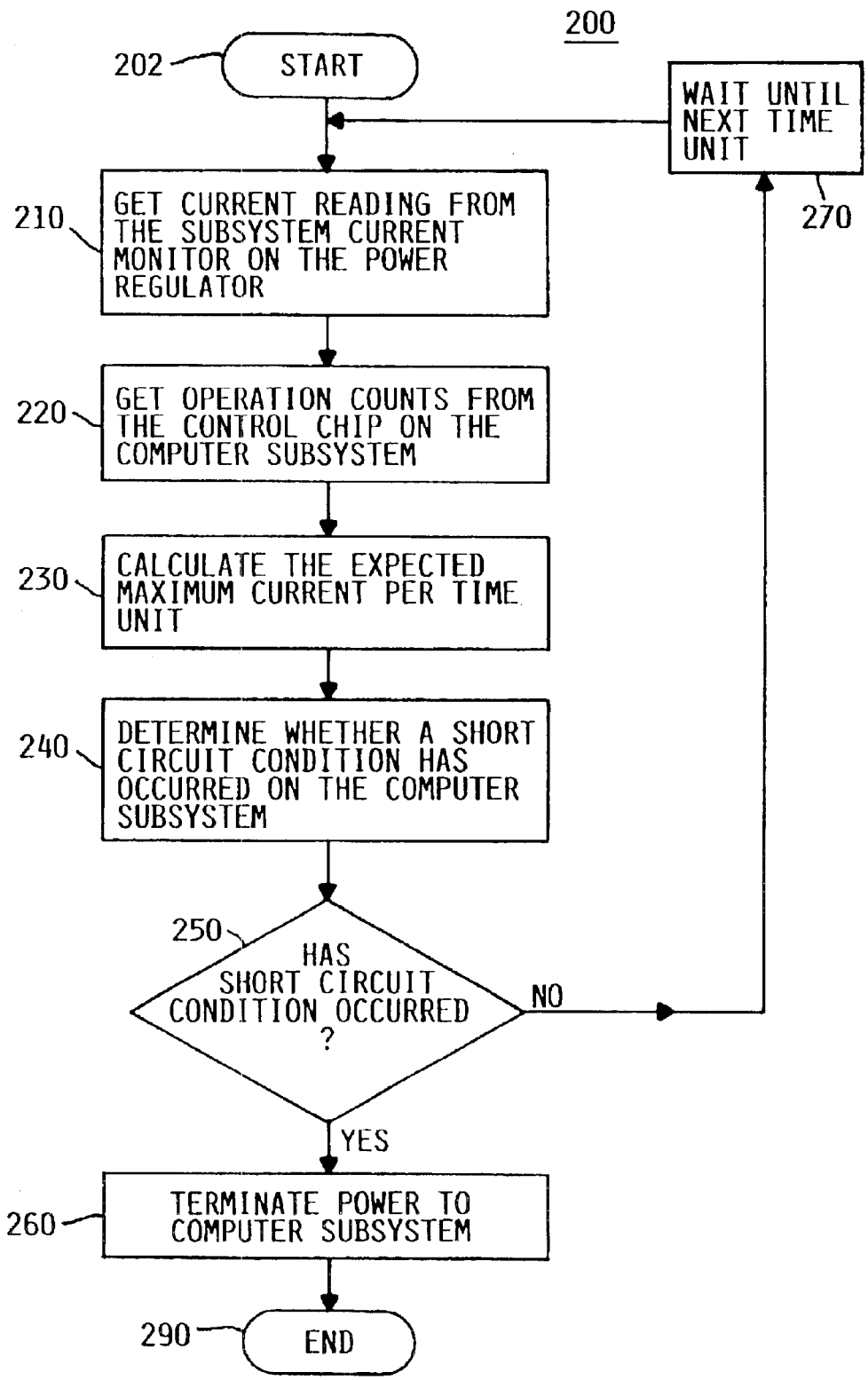
FIG. 2 is a flow chart illustrating one embodiment of a method 200 for monitoring and controlling electrical current delivered to a computer subsystem 102.

FIG. 2 is a flow chart illustrating one embodiment of a method 200 for monitoring and controlling electrical current delivered to a computer subsystem 102. The method 200 represents one embodiment of the short circuit detection program 114 which is run on the service processor 110. The method 200 begins at block 202 and proceeds to block 210 to get the current monitor reading from the subsystem current monitor 120 on the power regulator 140. In one embodiment, the subsystem current monitor 120 provides a reading of the total amount of electrical current supplied during a time unit, and the method 200 resets the subsystem current monitor 120 to measure the total amount of electrical current supplied during the next time unit. The time unit may be defined in the method 200 appropriately to correspond to the performance of the computer subsystem 102 and the subsystem current monitor 120. The method 200 may store the current monitor reading in one or more memory devices or registers associated with the service processor 110. More than one current monitor readings may be stored as required to evaluate a short circuit condition. For example, current monitor readings for two consecutive time units may be needed to evaluate a short circuit condition.

The method 200 then proceeds to block 220 to get the operation counts for the same time unit from the control chip 130 on the computer subsystem 102. The data provided by the control chip 130 may include the types of operation performed by the computer subsystem 102 and an occurrence count for each type of operation performed during the time unit. The data read from the control chip 130 may be stored in one or more memory devices or registers associated with the service processor 110. A plurality of operation count data may be stored as required to evaluate a short circuit condition. After receiving the data from the control chip 130, the method 200 resets the operation counter 135 to count the operations performed during the next time unit. Although blocks 210 and 220 are shown sequentially, these steps may be performed simultaneously or in reverse sequence.

The method 200 then proceeds to block 230 to calculate the expected maximum current per time unit based on the data received for the operation counts from the control chip. A predefined calculation algorithm may be utilized to calculate the expected maximum current per time unit. For example, each operation occurred during the time unit may be multiplied by a predefined factor for the specific operation, and a sum of these results may represent the expected maximum current for the time unit. In one embodiment, the predefined factors may be fixed current values for each kind of operation (e.g., read, write, standby, etc., for a memory module). In another embodiment, the predefined factor may be determined from a testing portion of an IPL (initial program load) sequence. For example, for a computer subsystem comprising a memory module, during a memory testing of an IPL sequence, specific known patterns (e.g., refresh, write read, etc.) may be cycled and the electrical current delivered to the memory module may be read while the specific known patterns are cycled to generate the predefined factors to be utilized for the calculation of expected maximum current.

The method 200 then proceeds to block 240 to determine whether a short circuit condition has occurred on the computer subsystem 102. In one embodiment, a short circuit condition occurs when the measured current per time unit from the current monitor exceeds the calculated expected maximum current by more than a certain percentage (e.g., 10%) for two consecutive time units. In another embodiment, a short circuit condition occurs when the measured current per time unit from the current monitor exceeds the calculated expected maximum current by more than a certain percentage (e.g., 20%) for the same time unit. The short circuit condition may be defined or customized appropriately for the type of computer subsystem and the types of operations.

At block 250, if a short circuit condition has occurred, the method 200 proceeds to block 260 and terminates the electrical power supplied to the computer subsystem 102, and the method 200 ends at block 290. If a short circuit condition has not occurred at block 250, the method 200 proceeds to block 270 and wait until the next time unit, and then the method 200 returns to block 210 to analyze the electrical current for the next time unit.

Figure 3:
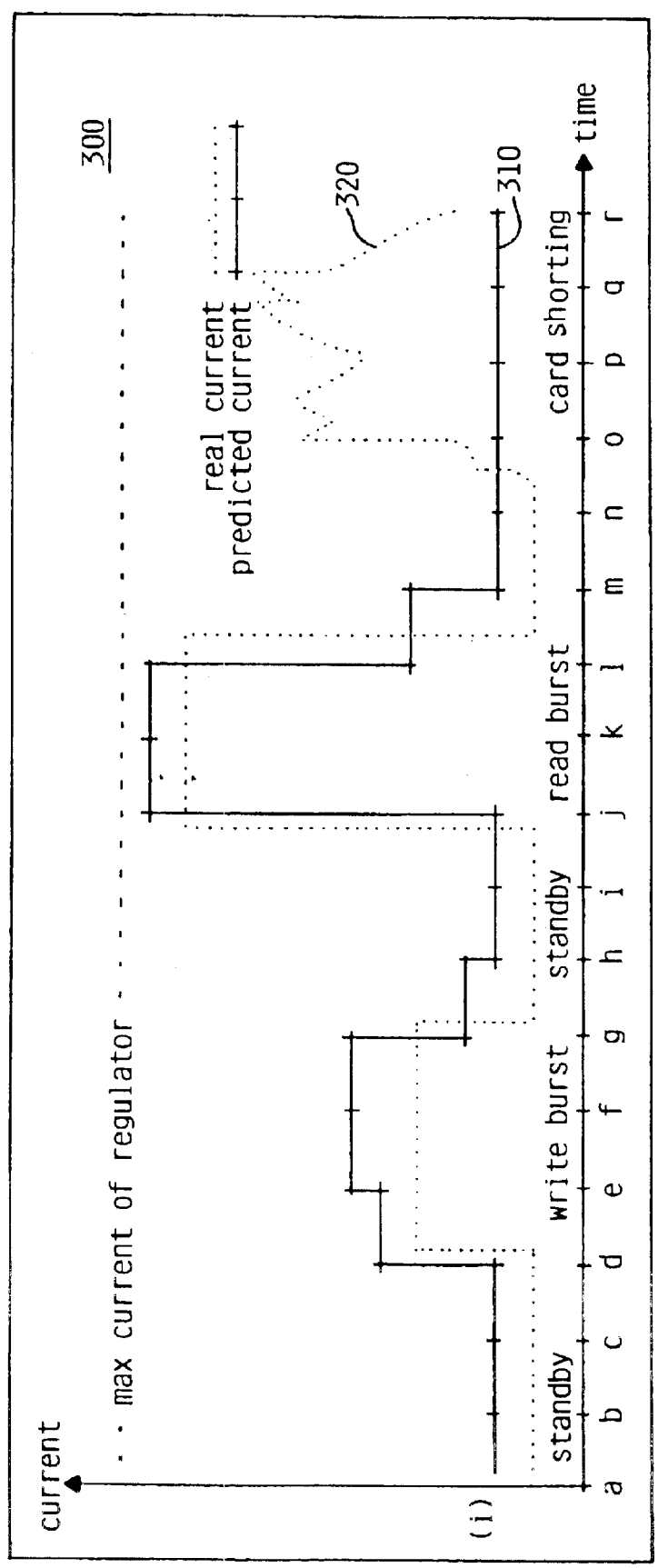
FIG. 3 is a graphical illustration of an example of a short circuit condition.

FIG. 3 is a graphical illustration of an example of a short circuit condition. The graph 300 illustrates the expected maximum current 310 and the measured current 320 for time units a through r. As illustrated, for time units a through o, the measured current 320 does not exceed the expected maximum current 310 for any whole time units. The measured current 320 does exceed the expected maximum current 310 for a portion of some time units (e.g., from g to h, from i to j, from l to m, and from n to o). During the time units from o to r, the measured current 320 exceeds by more than a desired percentage (e.g., 10%) of the expected maximum current 310 for the whole duration of these time units. If a short circuit condition is defined as when the measured current per time unit from the current monitor exceeds the calculated expected maximum current by more than 10% for two consecutive time units, the service processor 110 detects that a short circuit condition has occurred at time q (after time units o-p and p-q) and sends a signal to the power regulator 140 to terminate the electrical power supplied to the computer subsystem 102.

While the foregoing is directed to embodiments of the present invention, other and further embodiments of the invention may be devised without departing from the basic scope thereof, and the scope thereof is determined by the claims that follow.

What is claimed is:

1. A method for detecting a short circuit in a computer subsystem, comprising:
   obtaining a measured current which is supplied to the computer subsystem during a plurality of time periods;
   determining an expected current utilized by the computer subsystem for the plurality of time periods, wherein the expected current varies over the plurality of time periods in accordance with a changing current draw of the computer subsystem during normal operation; and
   determining whether a short circuit condition exists based on a comparison between the measured current and the expected current.

2. The method of claim 1, further comprising:
   terminating electrical power supplied to the computer subsystem.

3. The method of claim 1, wherein the short circuit condition exists if the measured current exceeds the expected current by more than a desired percentage for one or more same time periods.

4. The method of claim 1, wherein the short circuit condition exists if the measured current exceeds the expected current for at least two consecutive time periods.

5. The method of claim 1, wherein the measured current is determined utilizing measurements from a current monitor for a power regulator.

6. The method of claim 1, wherein the expected current is determined utilizing data from a control chip on the computer subsystem.

7. The method of claim 6, wherein the expected current is calculated utilizing a prediction algorithm including an operation count and one or more multiplication factors.

8. The method of claim 7, wherein the expected current is determined utilizing test data from an initial program load sequence.

9. A signal bearing medium, comprising a program which, when executed by a processor, performs an operation for detecting a short circuit in a computer subsystem, the operation comprising:
   obtaining a measured current which is supplied to the computer subsystem during a plurality of time periods;
   determining an expected current utilized by the computer subsystem for the plurality of time periods, wherein the expected current varies over the plurality of time periods in accordance with current draw of the computer subsystem during normal operation; and
   determining whether a short circuit condition exists based on a comparison between the measured current and the expected current.

10. The signal bearing medium of claim 9, wherein the operation further comprises terminating electrical power supplied to the computer subsystem.

11. The signal bearing medium of claim 9, wherein the short circuit condition exists if the measured current exceeds the expected current by more than a desired percentage for one or more same time periods.

12. The signal bearing medium of claim 9, wherein the short circuit condition exists if the measured current exceeds the expected current for at least two consecutive time periods.

13. The signal bearing medium of claim 9, wherein the measured current is determined utilizing a current monitor for a power supply.

14. The signal bearing medium of claim 9, wherein the expected current is determined utilizing data from a control chip on the computer subsystem.

15. The signal bearing medium of claim 14, wherein the expected current is calculated utilizing a prediction algorithm including an operation count and one or more multiplication factors.

16. The signal bearing medium of claim 15, wherein the expected current is determined utilizing test data from an initial program load sequence.

17. A system for detecting a short circuit in a computer subsystem, comprising:
   a current monitor disposed on a power regulator for monitoring electrical current supplied to the subsystem;
   a control chip disposed on the subsystem for monitoring operations performed on the subsystem; and
   a service processor connected to receive information from the current monitor and the control chip, the service processor configured to:
      obtain a measured current which is supplied to the computer subsystem during a plurality of time periods;
      determine an expected current utilized by the computer subsystem for the plurality of time periods, wherein the expected current varies over the plurality of time periods in accordance with current draw of the computer subsystem during normal operation; and
      determine whether a short circuit condition exists based on a comparison between the measured current and the expected current.

18. The system of claim 17, wherein the service processor is further configured to terminate electrical power supplied to the computer subsystem.

19. The system of claim 17, wherein the service processor is configured to determine that the short circuit condition exists if the measured current exceeds the expected current by more than a desired percentage for one or more same time periods.

20. The system of claim 17, wherein the service processor is configured to determine that the short circuit condition exists if the measured current exceeds the expected current for at least two consecutive time periods.

21. The method of claim 1, wherein the expected current varies with respect to different operations being performed by the computer subsystem during each of the plurality of time periods.

22. The signal bearing medium of claim 9, wherein the expected current varies with respect to different operations being performed by the computer subsystem during each of the plurality of time periods.

23. The system of claim 17, wherein the expected current varies with respect to different operations being performed by the computer subsystem during each of the plurality of time periods.

24. The method of claim 1, wherein the expected current of each given one of the plurality of time periods is determined in advance of obtaining the respective measured current to which the expected current is compared for the respective given one of the plurality of time periods.

25. The signal bearing medium of claim 9, wherein the expected current of each given one of the plurality of time periods is determined in advance of obtaining the respective measured current to which the expected current is compared for the respective given one of the plurality of time periods.

26. The system of claim 17, wherein the expected current of each given one of the plurality of time periods is determined in advance of obtaining the respective measured current to which the expected current is compared for the respective given one of the plurality of time periods.

* * * * *